United States Patent [19]

Chacon

[11] 4,140,065
[45] Feb. 20, 1979

[54] MODULAR FURNITURE

[76] Inventor: Luis M. Chacon, P.O. Box 920, San José, Costa Rica

[21] Appl. No.: 763,896

[22] Filed: Jan. 31, 1977

[51] Int. Cl.² .................................................. A47B 13/00
[52] U.S. Cl. ..................................... 108/156; 297/440
[58] Field of Search .................. 297/440, 442, 441; 108/156, 159, 111, 157, 153; 248/188

[56] References Cited

U.S. PATENT DOCUMENTS

| | | | |
|---|---|---|---|
| 1,675,827 | 7/1928 | Shrader | 108/156 |
| 2,279,864 | 4/1942 | Eide | 297/442 X |
| 2,543,875 | 3/1951 | Silverman | 297/440 X |
| 2,615,771 | 10/1952 | Curtis | 108/159 |
| 2,825,101 | 3/1958 | Rubenstein | 297/440 X |
| 3,485,527 | 12/1969 | Barghout | 297/442 X |
| 3,578,385 | 5/1971 | Stiglitz | 297/440 |
| 3,612,289 | 10/1971 | Zink | 108/111 X |
| 3,680,916 | 8/1972 | Gilbert | 297/440 |
| 3,788,700 | 1/1974 | Wartes | 297/442 |
| 3,858,529 | 1/1975 | Salladay | 108/111 X |

Primary Examiner—Francis K. Zugel
Attorney, Agent, or Firm—Laff, Whitesel & Rockman

[57] ABSTRACT

A number of relatively wide, preferably wooden panels are shaped and proportioned to cover the entire areas of a back, a seat, or an end of a sofa or chair. The panels have tabs or hooks and mating slots which fit into each other when the panels come together in a proper fit. At that time the parts are interconnected by wedge-shaped pegs. The shapes, angles and dimensions of these tabs, hooks and slots are such that the panels inherently wedge together more tightly, as the furniture supports the weight of one or more persons. The panels become even more tightly wedged together when the people sitting upon the furniture move and shift their weight. A similar approach enables tables or other articles of furniture to be assembled in a similar manner.

1 Claim, 7 Drawing Figures

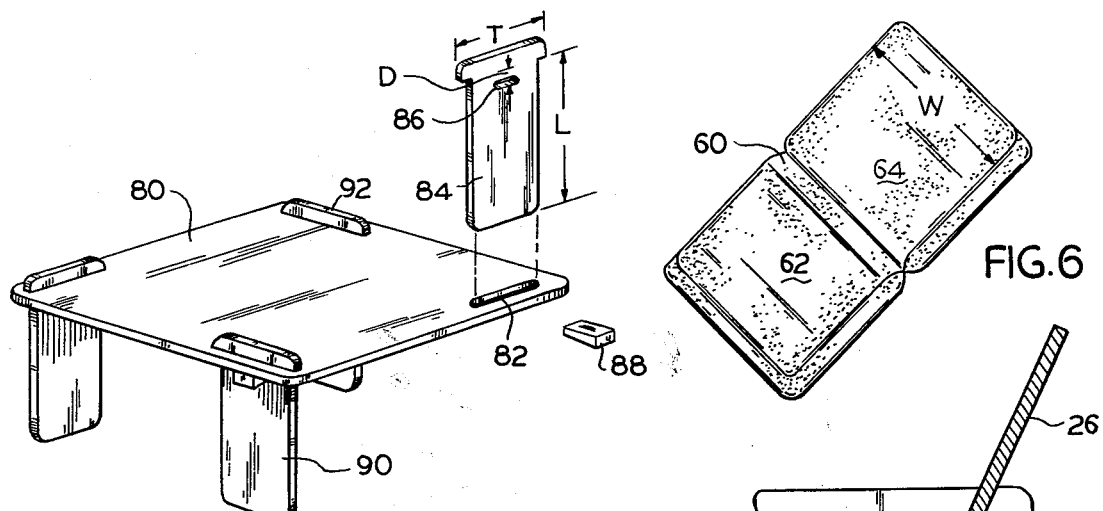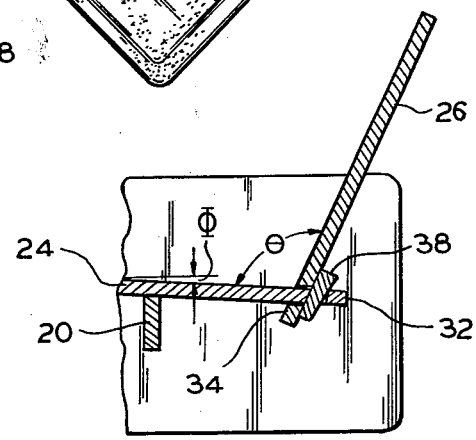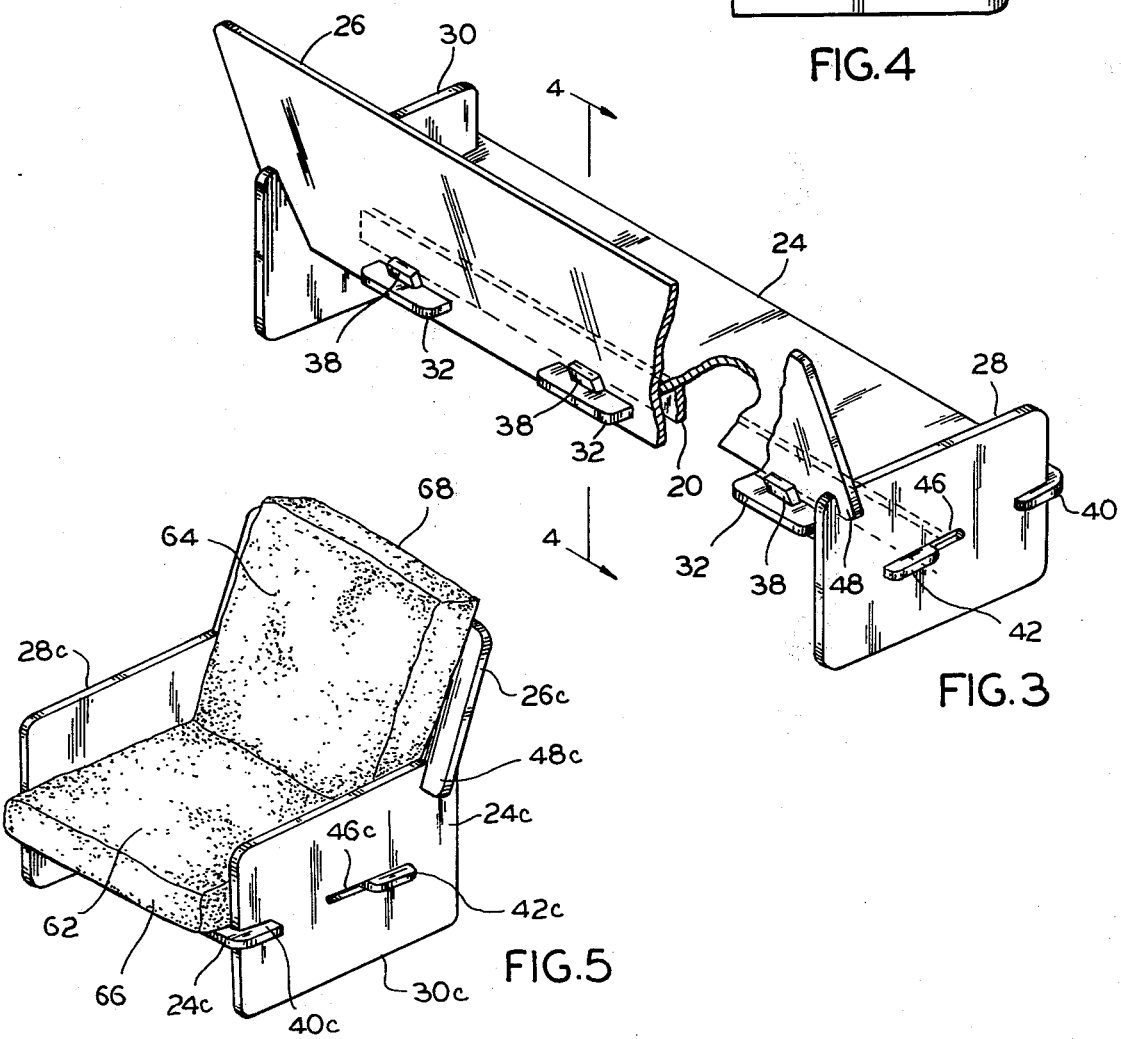

MODULAR FURNITURE

This invention relates to modular furniture and more particularly to furniture which can be shipped to location in a knocked-down state, and there assembled by persons with no special training, and without the requirement that special tools be used.

Generally, furniture is large and bulky, so that it occupies a substantial volume in a shipping container or a transport vehicle. Thus, it is relatively expensive to ship furniture, as compared to the cost of shipping other things. This is especially unfortunate when the furniture is made from an exotic material which is only available at an extremely distant location, sometimes in remote areas with a poorly developed transportation system. Exemplary of such material are the beautifully grained hardwoods from tropical jungles.

Other considerations for furniture design relate to its appearance, utility, and comfort. The furniture should have the proportions of a human body and the sitting angle should be comfortable. As people squirm about and shift their weight while sitting on chairs, sofas, lounges, or the like, severe stresses and strain are placed upon fastening members. Therefore, a knock down kit of parts for making these furniture items must inherently resolve itself into properly interconnecting relationships. When so interconnected, the furniture should not become loose and wiggle over its life time. This means that the interconnected furniture parts must be very tightly clamped together after the assembly is completed.

Hence, there are conflicting demands, because an article of furniture made from a knock down kit which does not require tools for assembly is not likely to always have the correct interconnecting relationship. If the parts can be assembled without tools, it is not likely that the furniture parts will also be so tightly secured together that the cannot become loosened.

Accordingly, an object of this invention is to provide new and improved furniture which may be made from knock down kits. Here, an object is to provide furniture which may be shipped in a knock-down condition, with virtually no waste space in the shipping container. In this connection, an object is to provide furniture of a design which enables on site assembly with virtually no need for tools.

A further object of the invention is to provide a system for making and shipping knock-down furniture, which system is especially well suited for use of exotic hardwoods, especially those woods which come from remote parts of the world having less fully developed transportation systems.

Yet another object of the invention is to provide furniture, of attractive appearance, which can provide the above-cited functions. Here, an object is to provide for use of massive wooden panels without creating an oppressively massive appearance.

In keeping with an aspect of the invention, these and other objects are accomplished by providing large wood panels which cover the entire area of a back, a seat, or an arm. The panels have tabs and mating slots so that they may be slipped together and then interconnected by wedge-shaped pegs. The angles of the various slots are such that the wooden panels inherently wedge together more tightly, as the furniture supports weight. When people sitting upon the furniture shift their weight, the wooden panels fit together more tightly. Because of this method of interconnecting panels, there is an extremely strong construction. The various panels may be made thinner than they otherwise would be. This gives a lighter less massive appearance.

The nature of a preferred embodiment of the invetion may be understood best from a study of the attached drawings showing three exemplary pieces of furniture, wherein:

FIG. 3 is an assembled, perspective view (partly in cross section) of the sofa of FIG. 1;

FIG. 4 is a cross-sectional view of the sofa, taken along the line 4—4 of FIG. 3;

FIG. 5 is an assembled view (with cushions in place) of the chair of FIG. 2;

FIG. 6 is a perspective view of a combination back and seat cushion; and

FIG. 7 is a partly assembled view of a table made by the inventive process.

Figure 1:
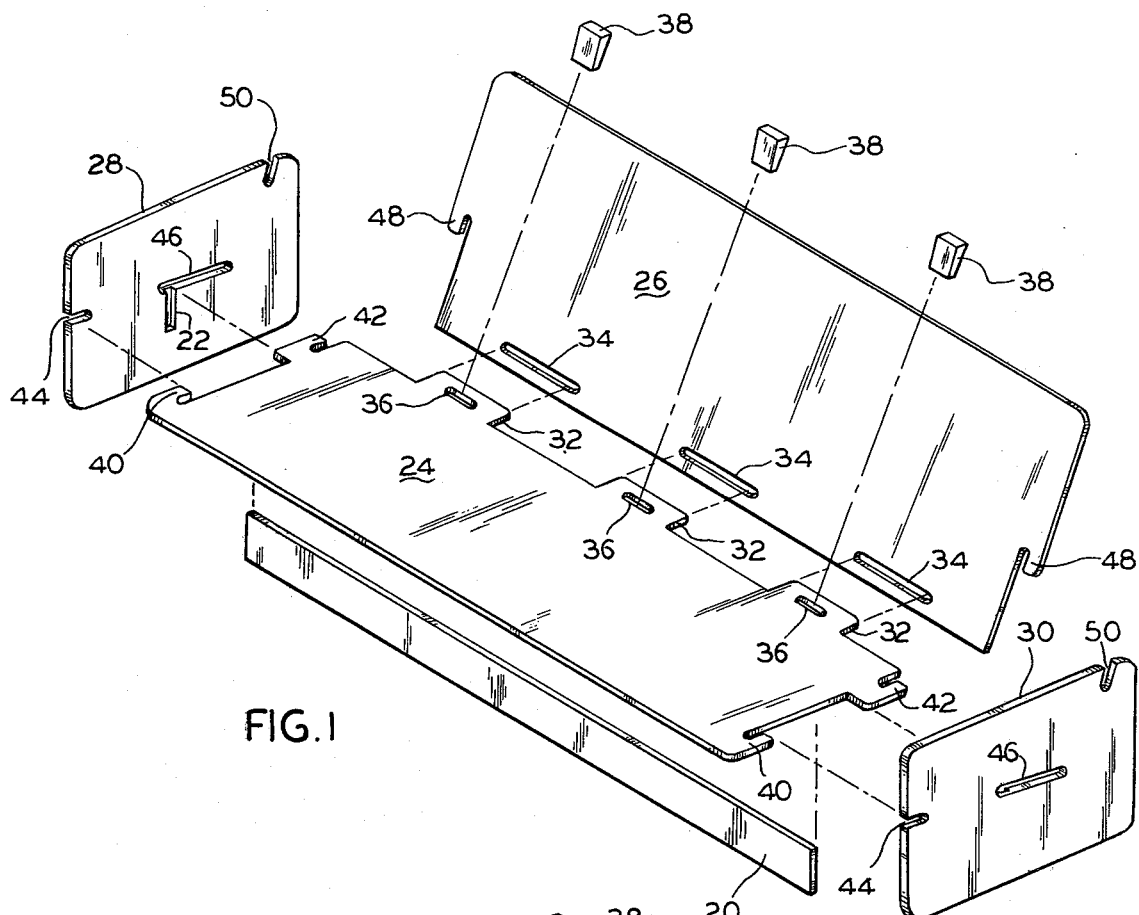
FIG. 1 is an exploded view of the solid parts of a sofa made by the inventive process.
Figure 2:
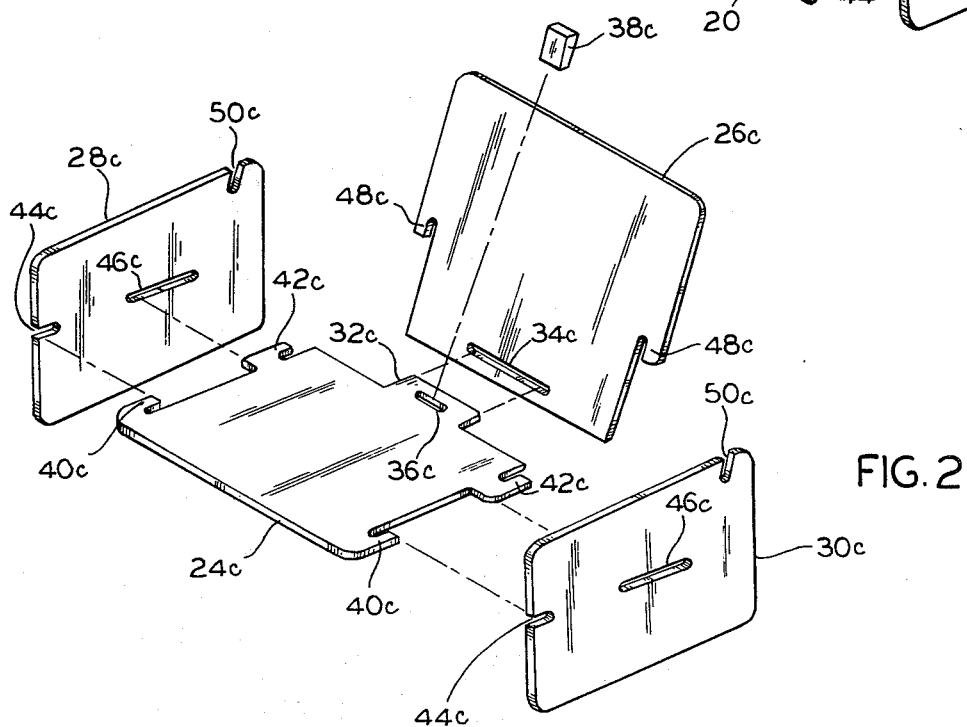
FIG. 2 is an exploded view of the solid parts of a chair made by the inventive process.

The sofa (FIGS. 1 and 3) and chair (FIGS. 2 and 5) are similar, in concept, except that the sofa includes an under-the-seat supporting member 20 which fits into its associated supporting slots 22. Therefore, only the sofa will be described herein in detail. Similar reference numerals will be used for corresponding parts in all of these figures except that the numerals used on the chair in FIGS. 2, 5 will include the suffix "C" for chair.

The major components used by the invention to make a sofa comprise a seat 24, back 26, and two end panel arms 28, 30. Each of these components is a single and unitary panel made from any solid and rigid material. In the preferred embodiment, they are solid wooden boards which are edge glued together. However, the invention is not limited thereto. Any suitable boards, such as plastic, metal, wood veneer over a solid or plywood core, or the like may be used.

The seat and back boards 24, 26 have any suitable number of complimentary tabs 32 and slots 34 which form connectors. The sofa is here shown as having three such connectors and the chair as having one. As here shown, the tabs 32 are on the seat 24 and the slots are on the back 26; however, these relative positions may be interchanged. As best seen in FIG. 4, the slot is not formed perpendicularly in the back, but is cut at an angle so that, when joined, the back and seat form an angle $\theta$ with respect to each other, when the tab 32 is fitted snugly into the slot 34. This angle $\theta 0$ is selected according to the comfortable sitting position for persons who may occupy the sofa.

Each tab 32 contains a peg hole 36 which receives a wedge-shaped peg 38. The peg holes 36 are formed at an angle that is complimentary to the angle of the connector slots 34. Thus, after the back and seat panels 24, 26 are assembled with the connector tabs 32 and slots 34 properly assembled, the wedges 38 may be placed in the peg holes 36 and driven tightly into place. This driven wedge tightly locks the two panels 24, 26 together.

Each end of the seat panel 24 has a pair of hook members 40, 42 formed therein. Each of the end panels 28, 30 contain slots 44, 46 which are complimentary to the end hooks 40, 42. The front hooks 40 reach around the front edges of panels 28, 30 and fit into slots 44. The rear hooks 42 fit through the slots 46. Then, the seat panel slides toward the back 26, with the hooks 40, 42 fitting over the edges of slots 44, 46.

The back panel 26 also has hooks 48, at opposite ends, which fit down and into two slots 50 which are formed in each end panel 28, 30. The slots 50 set at the angle θ, with respect to the vertical edge of the end panels 28, 30.

In very long structures, such as a sofa (FIGS. 1, 3, 4), a seat supporting bar 20 fits between the end panels 28, 30. Bar 20 has its wide dimension oriented vertically to support the seat 24. The opposite ends of the support bar 20 fit into recesses 22 which are formed on the inside surfaces of the panels 28, 30. Preferably, the recesses 22 are milled into the end panels 28, and do not extend through them. This is in contrast with the slots 44, 46, 50 which extend completely through the end panels 28, 30. Of course, it is also possible for the support bar 20 to project completely through end panels 28, 30 and to be there wedged in place by wedges, such as 38.

The assembly of the sofa begins with an insertion of hooks 40, 42 on one end of the seat panel 24 into the slots 44, 46 of one end panel 28. At the same time the seat panel 24 is slid slightly toward the back in order to engage hooks 40, 42 in slots 44, 46. Next, one end of the support bar 20 is placed in the recess 22 of the end panel 28. Then, the end panel 30 is brought up to the opposite end of the panel 24 where the other end of support bar 20 is fitted into a recess 22 (not seen) in panel 30, while the hooks 40, 42 are fitted into slots 44, 42. The end panel 30 is slid forward far enough to engage the hooks 40, 42.

Care is taken to be sure that the correct surface of the back panel 26 is facing forward, so after the tabs 37 are fitted through slots 34 while the back 26, and seat 24 form the angle θ; then, tabs 32 are fitted into slots 34. At this time, all of the major parts are interconnected, but they are not forced together far enough to immobilize the panels. Therefore, it is possible to work each of the connector tabs 36 into the mating slots 34 and the hooks 48 into slots 50.

After the parts are so assembled, the seat panel 24 is forced toward the back panel 26. This causes the hooks 40, 42 to be driven into a firm capture position as the back of the seat panel 24 is brought up snugly against the front surface of the back panel.

It should be noted that the seat panel 24 has a slightly downward slant at the angle Φ (FIG. 4). Therefore, as a person sits on the seat panel 24, it is forced rearwardly. The resulting downward force upon slots 34 pulls panel 26 and further snugs hooks 48 into the slots 50. Thus, any additional stresses by persons shifting their weight while sitting in the sofa will tend to tighten the parts.

After the panels are brought together as snugly as is conveniently possible with manual forces, the pegs 38 are fitted into the peg holes 36. Then, they may be driven into place by suitable blows. (If a hammer is used, the tops of the pegs 38 should be protected to prevent the wood from splitting or mushrooming). The wedge of the pegs 38 forces the parts together with substantial force. This locks the sofa members very tightly together.

The chair parts (FIGS. 2, 5) fit together exactly as the sofa parts fit together, except that the width of the chair is in the order of one-third the length of the sofa. Therefore, there is no need for the chair to have a seat supporting bar 20.

The cushion for the inventive furniture is seen in FIG. 6. It has a width W exactly equal to the width of the chair or, perhaps one quarter or one third the width of the sofa. This means that exactly three or four cushions will exactly fit into the sofa frame. Each cushion (FIG. 6) comprises a bolster formed from a tube of upholstery material stuffed with two resilient cushions, which may be rubber, dense foam, or the like, for example. The tube of upholstery material is stitched along each end and also transversely at 60 to divide it between the two cushions. This forms the bolster into a first or seat cushion 62 and a second or back cushion 64. When the bolster is folded along the line of stitching 60, it may be fitted into the assembled wooden frame, as best seen in FIG. 5. The front edge 66 of seat cushion 62 overhangs the front edge of seat panel 24. The top edge 68 of back cushion 64 projects above the top edge of the back panel. Hence, there are no hard edges to be uncomfortable for a person sitting in the chair. Three or four of these cushions may be placed on the assembled sofa frame (FIG. 3) to upholster it in the same manner.

In addition to chairs and sofas, the same construction techniques may be used to make other furniture elements. For example, FIG. 7 shows a table which could be a coffee table, end table, card table, dining room table, conference table, or the like.

Here, the top 80 has a series of at least four slots 82 formed therein and preferably parallel to the edges thereof. In other embodiments, there may be eight (for example) such slots, perhaps arranged in "L-shaped" pairs at corners. Furthermore, additional slots may be formed intermediate the ends and along the edges of table top 80, if the table becomes long enough (as for a dining or a conference room, for example).

Each leg is a generally "T-shaped" member 84 comprising a leg portion L and a top portion T. Displaced downwardly a distance D from the bottom of top T is a peg hole 86. To assemble the table, leg 84 is dropped through slot 82. Then, the wedged peg 88 is driven into the peg hole 86. This anchors the leg in place under the table top. Of course, some of the previously-described techniques may also be applied to the table. For example, a supporting bar similar to bar 20 may extend between recesses formed in opposing legs (as between legs 90, 92, for example).

The invention is also broad enough to combine the disclosed parts in different ways. For example, the T-shaped leg member 84 could be used between the cushions on the sofa or the hooks 40, 42 on the sofa could be adapted to hook together adjacent legs on a table. Therefore, the appended claims should be construed broadly enough to cover all equivalents falling within the scope and spirit of the invention.

I claim:

1. Modular furniture which may be shipped in a knocked-down kit form, said furniture comprising a panel in the size and shape of a table top, a slot formed in said table top panel adjacent each corner of said panel, each of said slots running parallel to an edge of said table in the corner where said slot is located, at least four other panels, each of said other panels having a generally "T" shape, the stem part of said T-shaped panels passing through said slots, and depending below the table top with the top of said "T" being captured by the surface of the table top which is above the slot, slot means formed in the stem part of the "T" which is immediately below the table top, and wedge-shaped peg means for locking said "T" panel in place on said table top.

* * * * *